United States Patent
Wilcox

(10) Patent No.: US 7,850,180 B2
(45) Date of Patent: Dec. 14, 2010

(54) HUB ASSEMBLY FOR A TILTING VEHICLE SUSPENSION

(76) Inventor: Joseph Wilcox, 100 Forest Ave., Palo Alto, CA (US) 94301

( * ) Notice: Subject to any disclaimer, the term of this patent is extended or adjusted under 35 U.S.C. 154(b) by 97 days.

(21) Appl. No.: 12/255,148

(22) Filed: Oct. 21, 2008

(65) Prior Publication Data

US 2009/0108555 A1 Apr. 30, 2009

Related U.S. Application Data

(60) Provisional application No. 60/982,150, filed on Oct. 24, 2007.

(51) Int. Cl.
*B60G 21/00* (2006.01)
*B62D 61/06* (2006.01)
(52) U.S. Cl. .................. 280/124.103; 180/210; 280/124.111
(58) Field of Classification Search ............ 180/210; 280/124.103, 124.11, 124.111, 124.127, 280/124.134
See application file for complete search history.

(56) References Cited

U.S. PATENT DOCUMENTS

| | | | | |
|---|---|---|---|---|
| 1,093,131 | A | * | 4/1914 | Hays .................. 280/124.127 |
| 2,081,045 | A | * | 5/1937 | Soper .................. 280/124.126 |
| 2,135,152 | A | * | 11/1938 | Simmonds ........... 280/124.127 |
| 2,155,521 | A | * | 4/1939 | Zavarella ............. 280/124.127 |
| 3,137,513 | A | | 6/1964 | Marot |
| 3,964,563 | A | | 6/1976 | Allen |
| 4,020,914 | A | * | 5/1977 | Trautwein ............. 180/210 |
| 4,145,072 | A | | 3/1979 | Matschinsky |
| 4,325,565 | A | | 4/1982 | Winchell |
| 4,469,344 | A | | 9/1984 | Coil |
| 4,662,467 | A | * | 5/1987 | Arai et al. ............. 180/210 |
| 4,685,690 | A | | 8/1987 | Fujita et al. |
| 4,705,292 | A | | 11/1987 | Hespelt et al. |
| 4,740,004 | A | | 4/1988 | McMullen |
| 4,878,688 | A | | 11/1989 | Kubo |
| 4,887,829 | A | * | 12/1989 | Prince .................. 280/282 |

(Continued)

FOREIGN PATENT DOCUMENTS

WO 2004058521 A1 7/2004

OTHER PUBLICATIONS

Riley, Robert Q., "Three Wheel Cars Primary Factors that Determine Handling & Rollover Characteristics", http://www.rgriley.com/3-wheel.htm.

*Primary Examiner*—Paul N Dickson
*Assistant Examiner*—Joseph Rocca
(74) *Attorney, Agent, or Firm*—Barlow, Josephs & Holmes, Ltd.

(57) ABSTRACT

A suspension system for a vehicle is provided that allows for the vehicle body to be tilted wherein the tilt is controlled by the operator's legs in a manner that greatly enhances the stability of the vehicle while producing a fun vehicle to operate. Generally a hub is provided for use ad the vertical members in a four-bar suspension linkage that includes an inboard side and an outboard side such that the tilting pivots are positioned inboard and the steering pivots are positioned outboard. This arrangement allows for the optimum placement of the pivot axis for steering as close to the wheel as possible, even directly within the rim of the wheel, while the pivot point of the suspension linkage is optimally positioned a few inches inboard relative to the wheels thereby increasing the lever arm used to control the relative tilt of the wheel.

7 Claims, 5 Drawing Sheets

U.S. PATENT DOCUMENTS

| | | |
|---|---|---|
| 5,040,812 A | 8/1991 | Patin |
| 5,405,162 A | 4/1995 | Chun |
| 5,496,055 A | 3/1996 | Shibahata et al. |
| 5,597,171 A | 1/1997 | Lee |
| 5,613,572 A | 3/1997 | Moedinger |
| 5,697,633 A | 12/1997 | Lee |
| 5,765,846 A | 6/1998 | Braun |
| 6,000,706 A | 12/1999 | Boberg et al. |
| 6,027,130 A | 2/2000 | Kawabe et al. |
| 6,123,351 A | 9/2000 | Bruehl |
| 6,250,649 B1 | 6/2001 | Braun |
| 6,305,700 B1 | 10/2001 | Bruehl |
| 6,328,125 B1 | 12/2001 | Van Den Brink et al. |
| 6,763,905 B2 | 7/2004 | Cocco et al. |
| 7,048,286 B2 | 5/2006 | Eppelein |
| 7,108,097 B1 | 9/2006 | Bolton et al. |
| 7,172,045 B2 | 2/2007 | Takayanagi et al. |
| 7,487,985 B1 * | 2/2009 | Mighell ............... 280/124.103 |
| 7,530,419 B2 * | 5/2009 | Brudeli .................... 180/210 |
| 7,591,337 B2 * | 9/2009 | Suhre et al. ............... 180/210 |
| 7,631,721 B2 * | 12/2009 | Hobbs ..................... 180/348 |
| 2006/0017240 A1 | 1/2006 | Laurent et al. |
| 2006/0185920 A1 | 8/2006 | Hibbert et al. |
| 2007/0126199 A1 * | 6/2007 | Peng et al. ........... 280/124.103 |

* cited by examiner

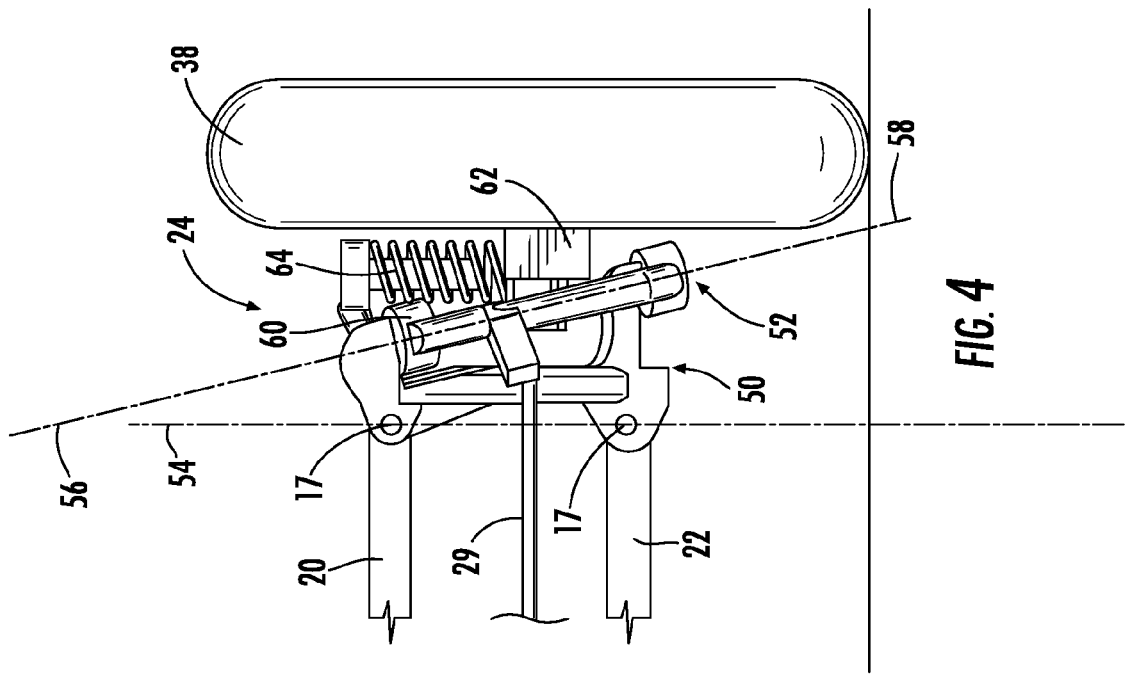
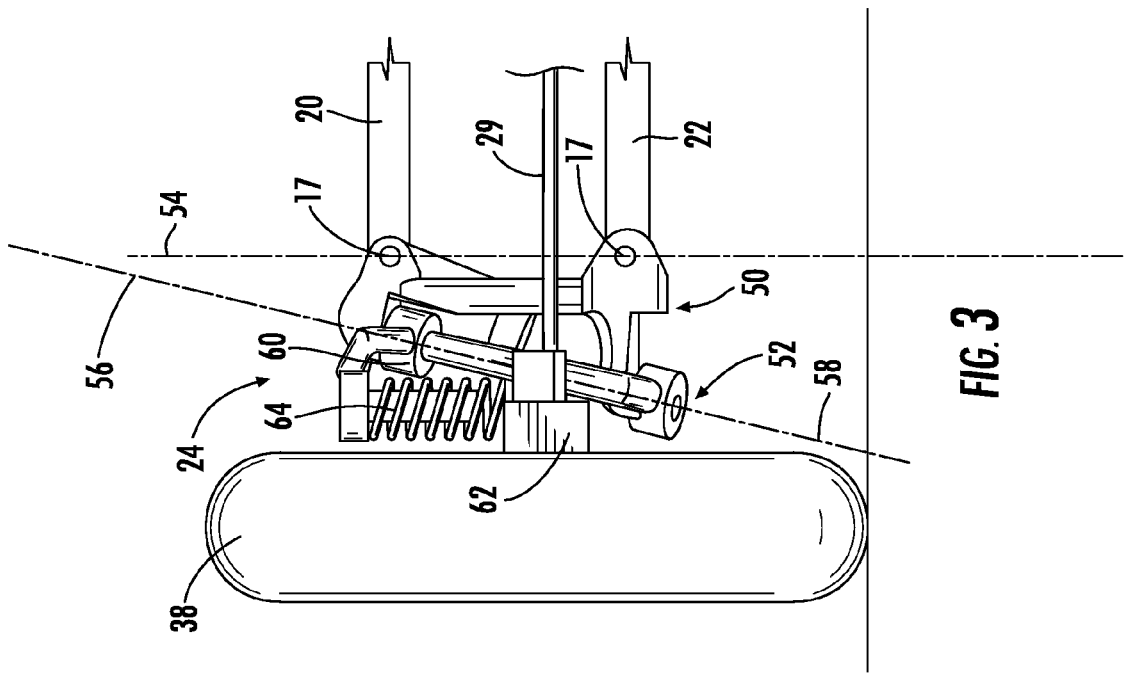

HUB ASSEMBLY FOR A TILTING VEHICLE SUSPENSION

CROSS-REFERENCE TO RELATED APPLICATIONS

This application is related to and claims priority from earlier filed U.S. Provisional Patent Application No. 60/982,150, filed Oct. 24, 2007.

BACKGROUND OF THE INVENTION

The present invention relates to generally to an improved suspension system for tilting vehicles. More specifically, the present invention relates to a hub arrangement for use in a tilting vehicle suspension that improves the overall performance of the vehicle by separating the tilting and steering axes in a manner that lengthens the tilting lever arm while shortening the steering lever arm in a manner that enhances overall vehicle control.

Currently, most motor vehicles on the highways are four-wheel vehicles that are typically larger, heavier and less fuel-efficient than three-wheel motor vehicles. Despite the fact that four wheeled vehicles are more common, there are several advantages to modern three-wheeled vehicles. For example, under most circumstances three-wheel vehicles by nature are more stable than four-wheel vehicles, as three points will form a plane under all circumstances, whereas four points do not. Another advantage is that three-wheel vehicles afford nearly ideal wheel loading for maximum tire traction in acceleration and braking situations. Despite the advantages that three wheeled vehicles enjoy over four-wheel vehicles, the main drawback of a three-wheel vehicle is that during a turn the centrifugal load of the vehicle is supported by only a single outside wheel rather than two, as would be the case in a four-wheeled vehicle. In this regard, the centrifugal force tends to overload the outside tire, causing the vehicle to slip out of the direction of the turn, unless some additional means of compensation is provided. Further, the three-wheel geometry allows the force vector associated with the vehicle's center of gravity to quickly fall outside the wheelbase of the vehicle causing an unstable condition whereby the risk of overturning the vehicle greatly increases. As the center of gravity in the vehicle rises higher, the potential for this to occur becomes much greater. In order to counteract these forces, generally three-wheeled vehicles employ a tilting-and-bank mechanism, which shifts the vehicle's center of gravity to the inside as it negotiated a turn thereby keeping more of the load on the inside tire and within the footprint of the wheelbase.

In the prior art, foot controlled tilting vehicle suspensions have typically employed ball joints placed at the four connecting points of a four-bar linkage to allow both vertical displacement for tilting as well as rotational displacement for steering. Such an arrangement creates several distinct problems. First, because the steering pivot must be positioned as close to the center of the wheel as possible, the trade off is that there is a greatly reduced distance of travel available for the foot controlled tilting function. As a result, a rider is required to apply a great deal of force with their feet to maintain the vehicle tilt through turns. Further, should a rider turn the vehicle too quickly, the force required to tilt the vehicle may increase so quickly that the rider may not be able to maintain the tilt, ultimately losing tilt control and flipping the vehicle.

Secondly, when using ball joints within a four bar suspension to allow both tilting and steering, the resultant steering axes are nearly vertical, greatly reducing steering performance and leading to bump steering effects for side mounted wheels. Ideally, steering axes for side-mounted wheels is configured in an angled fashion so that the axes intersect the tire contact patch, as evidenced by automobile suspension prior art. The problem is that this configuration is not possible if ball joints are used because the parallelogram four-bar linkage does allow proper vehicle tilting if it is wider at the bottom than at the top. Finally, the placement of ball joints at the ends of the linkage means that the linkage is not maintained in a rigid plane, except where it is pivotally connected to the frame. As a result, the connection at the frame must be extra strong to restrain any unwanted torsional articulation at the ends of the linkage members.

Accordingly, there is a need for a suspension system for a tilting vehicle that allows the forces generated by the vehicle to be transferred using a center of effort that is directed perpendicular to the traction surfaces of the tires. Further, there is a need for a suspension system for a tilting vehicle that provides for a separation of the tilting and steering axes to allow optimization of the forces needed for steering and tilting. Finally, the is a need for a suspension system for a tilting vehicle that both facilitates an increased leverage for foot control over the tilting function and provides an optimized positioning and geometry for steering control.

BRIEF SUMMARY OF THE INVENTION

In this regard, the present invention provides a suspension system for a wheeled vehicle that allows for the vehicle body to be tilted by the operator in a manner that greatly enhances the stability of the vehicle while producing a fun vehicle to operate. Further, the hubs that are employed to create the vertical components of the four bar suspension arrangement are configured in a manner that separates both the steering and tilting axes, spacing them apart from one another to increase the leverage available for tilting while allowing enhanced steering control.

In the most general terms, a hub is provided that includes an inboard side and an outboard side such that the tilting pivots are positioned inboard and the steering pivots are positioned outboard. This arrangement allows for the optimum placement of the pivot axis for steering as close to the wheel as possible, even directly within the rim of the wheel, where possible. While the pivot point of the suspension linkage is optimally positioned a few inches inboard relative to the wheels thereby increasing the lever arm relative to the tilt of the wheel. This placement this allows a greater lever arm sticking out perpendicularly from the wheel on which to apply a downward force, thereby causing the wheels and thus the entire linkage to tilt. When the linkage pivots are closer in towards the center of the vehicle, the lever arms are much longer and the downward force from the foot of the rider has an amplified effect on the tilt of the vehicle. As a consequence, while the footpads rise and fall more dramatically as the linkage articulates, which takes a little getting used to, the rider is able to create substantial tilting force with less force application to the footpads.

Further, by separating the two axes, the pivot points within the suspension are then attached using shoulder bolts and thrust bearings rather than ball joints. This arrangement makes the linkage connection points much more rigid. This also allows the steering geometry to be arranged such that the steering axis is tilted relative to a vertical plane so that it is aligned along an axis that intersects with the center point where the wheel contacts the ground.

Accordingly, it is an object of the present invention to provide a hub for a tilting vehicle suspension that separates the tilting and steering axes from one another. It is a further object of the present invention to provide a hub for use in a tilting vehicle suspension that facilitates for greater vehicle load-bearing capacity by reducing the overall foot pressure required to maintain the vehicle tilt at all speed ranges and during cornering maneuvers.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 3 is a detailed front view of the hub of the present invention;

FIG. 4 is a detailed rear view of the hub of the present invention;

DETAILED DESCRIPTION OF THE INVENTION

Figure 1:
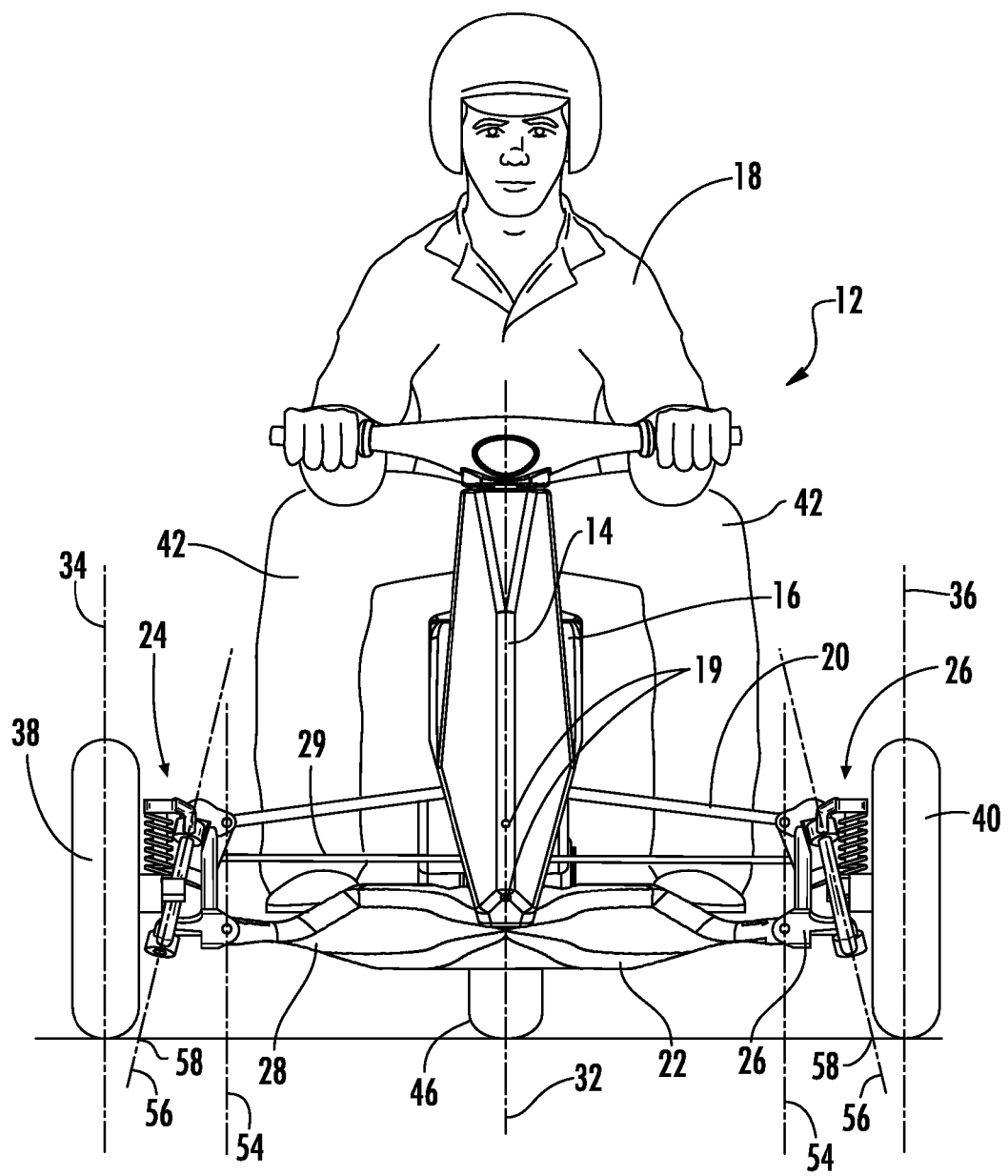
FIG. 1 is a front view of a vehicle equipped with the hub and suspension system of the present invention wherein the vehicle is in a vertical position.
Figure 2:
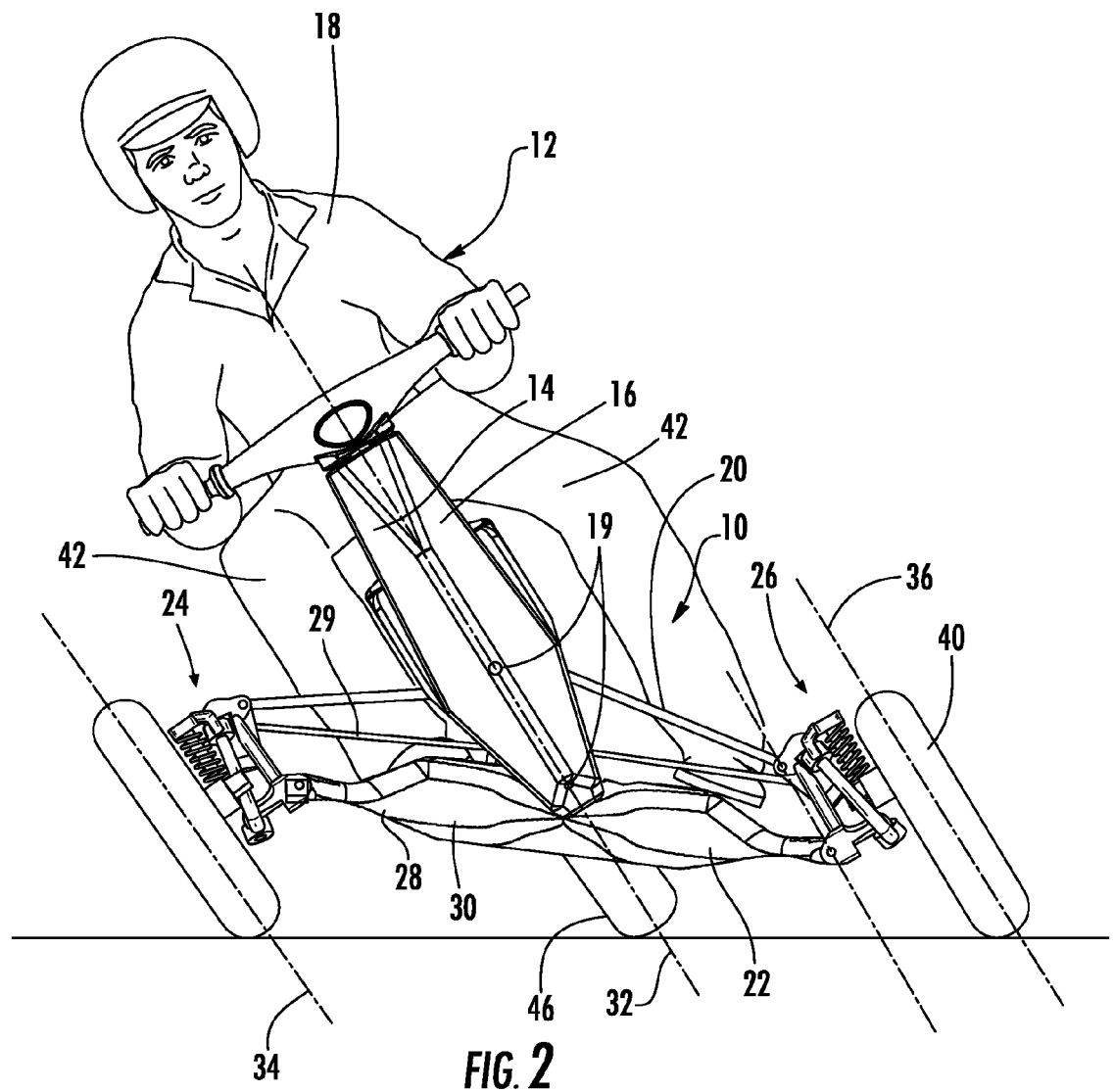
FIG. 2 is a front view of a vehicle equipped with the hub suspension system of the present invention wherein the vehicle is in a tilted position.

Now referring to the drawings, the suspension assembly for a tilting vehicle is shown and generally illustrated in the figures. FIGS. 1-2 depict the suspension assembly 10 employing hubs as taught by the present invention and they are installed at the front of a three-wheeled tilting vehicle 12. FIGS. 3-6 depict detailed views of the hubs in accordance with the present invention. Finally, FIG. 7 depicts the improved suspension geometry that is achieved through the hubs and suspension of the present invention.

As can be seen in FIGS. 1 and 2, the suspension system 10 of the present invention is depicted on a tilting vehicle 12 that is in an upright and a tilted position and is depicted in the context of a wheeled vehicle. In general terms, the suspension assembly 10 of the present invention includes a central frame 14 having a front, a rear and a support means 16 for a rider 18. The suspension assembly 10 can be seen attached to the front of the central frame 14 at pivots 19. The front suspension assembly 10 includes a top suspension bar 20 and a bottom suspension bar 22 each of which has a respective left end and right end. Further, the suspension assembly 10 includes a left hub 24 and a right hub 26 each having respect top and bottom ends. The geometry of the suspension assembly 10 is arranged such that the left ends of the top and bottom suspension bars 20, 22 are pivotally attached to the respective top and bottom ends of the left hub 24 and the right ends of the top and bottom suspension bars 20, 22 are pivotally attached to the respective top and bottom ends of the right hub 26 at pivots 17 such that said top and bottom suspension bars 20, 22 are substantially parallel to one another and said left and right hubs 24, 26 are substantially parallel to one another. It can also be seen that a central portion of the top and bottom suspension bars 20, 22 are pivotally affixed to the front of the central frame 14. As described above, the geometry of the suspension assembly 10 of the present invention is implemented preferably using a four bar suspension. The two suspension bars 20, 22 and two hubs 24, 26 that make up the suspension 10 are arranged in a parallelogram shape wherein top and bottom suspension bars 20, 22 are substantially parallel along the top and bottom of the suspension assembly 10 and the left and right hubs 24, 26 are substantially parallel to one another along the left and right sides of the suspension assembly 10. The ends of each of the suspension bars 20, 22 and hubs 24, 26 are pivotally attached to one another to form a hinged parallelogram.

The basic principal of the suspension system is to provide a pivoting vehicle 12 wherein a vertical axis 32 of the central frame 14 and a vertical set of axes 34, 36 running through each of two spaced tires 38, 40 remains parallel as the vehicle 12 tilts and wherein the user's 18 legs 42 control the tilt of the vehicle 12. It should be appreciated that a number of mechanical methods exist that provide this desired result. The important inventive concept is that the central frame 14 is connected to at least two wheels 38, 40 that tilt as the central frame 14 tilts so that these elements remain in their parallel orientation and that the control of the tilt of the central frame 14 is accomplished through the use of the rider's 18 legs 42 directly on either the top suspension bar 20 or more preferably the bottom suspension bar 22 of the suspension assembly 10 itself.

The arrangement of the present invention allows for the free leaning performance of a vehicle 12 without the need for a high level of traction between the tires 38, 40 and the travel surface in order for the vehicle to remain upright. As a result, the vehicle can be operated on snow, ice, dirt, etc. safely. Further, to enhance the stability of the vehicle 12 the hubs 24, 26 configured in accordance with the present invention provide for separation of the tilting axes and the steering axes as will be described in detail below in a manner that decreases the force needed to maintain the tilt of the vehicle 12 while improving the steering geometry.

Turning now to FIGS. 3-6, in the most general terms, left and right hubs 24, 26 are provided in place of vertical suspension bars, as were used in the prior art. Each of the hubs 24, 26 generally includes an interior or inboard portion 50 with a top end and a bottom end that are configured for pivotal attachment to the respective top and bottom ends the top and bottom suspension members 20, 22. In this geometry, the points of attachment 17 between the left and right hubs 24, 26 and said top and bottom suspension bars 20, 22 define tilting axes 54. In addition, each of the hubs 24, 26 includes an exterior or outboard wheel support portion 52 that is pivotally affixed to the interior portion 50 such that the pivotal attachment point between the interior portion 50 and the exterior portion 52 define steering axes 56. Of particular note in the context of the present invention is the fact that the steering axes 56 are positioned outboard and are inclined relative to the tilting axes 54. This arrangement allows for the optimum placement of the pivot axis 56 for steering as close to the wheel 38, 40 as possible, even directly within the rim of the wheel, where possible. It can also be seen that the steering geometry is arranged such that the steering axis 56 is tilted relative to a vertical plane so that it intersects both the tilting axes 54 at its top end and intersects with a point 58 close to where the wheel 38, 40 contacts the ground at its bottom end.

It should be appreciated by one skilled in the art that in order to operate the vehicle 12, the suspension assembly 10 must also provide a means for turning either the front 38, 40 or rear 46 travel surface interfaces (wheels) to allow the vehicle 12 to corner. In the simplest form, the front wheels 38, 40 are mounted to spindles that are pivotally affixed to the left and right hubs 24, 26 and connected via tie rods 29. It can be appreciated that as the vehicle 12 is tilted, the spindles and the two wheels 38, 40 mounted to the left and right hubs 24, 26 at pins 17 must also tilt to maintain the geometry of the parallelogram. In this respect, as the vehicle 12 is tilted the left and right wheels 38, 40 are also tilted and remain in parallel relation to the central frame 14. In addition however, the ability to pivot the wheel spindles relative to the suspension assembly 10 on bearings allows the wheels 38, 40 to be turned to allow the vehicle 12 to corner. The use of tilted steering axes 56 further improves the rider's ability to steer the vehicle 12 as it tilts because the steering axis 56 of the inboard wheel becomes more vertical as the vehicle tilts into the turn allowing greater turning force to be maintained on the interior wheel preventing the vehicle from sliding out of the turn.

Figure 6:
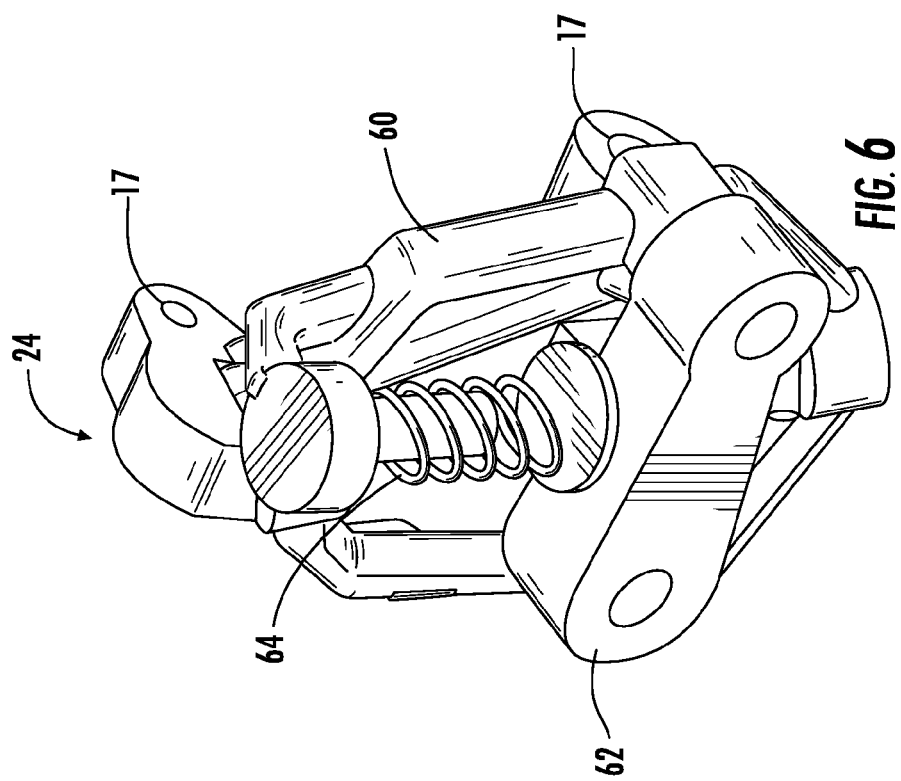
FIG. 6 is an outboard rear perspective view of the hub of the present invention.
Figure 5:
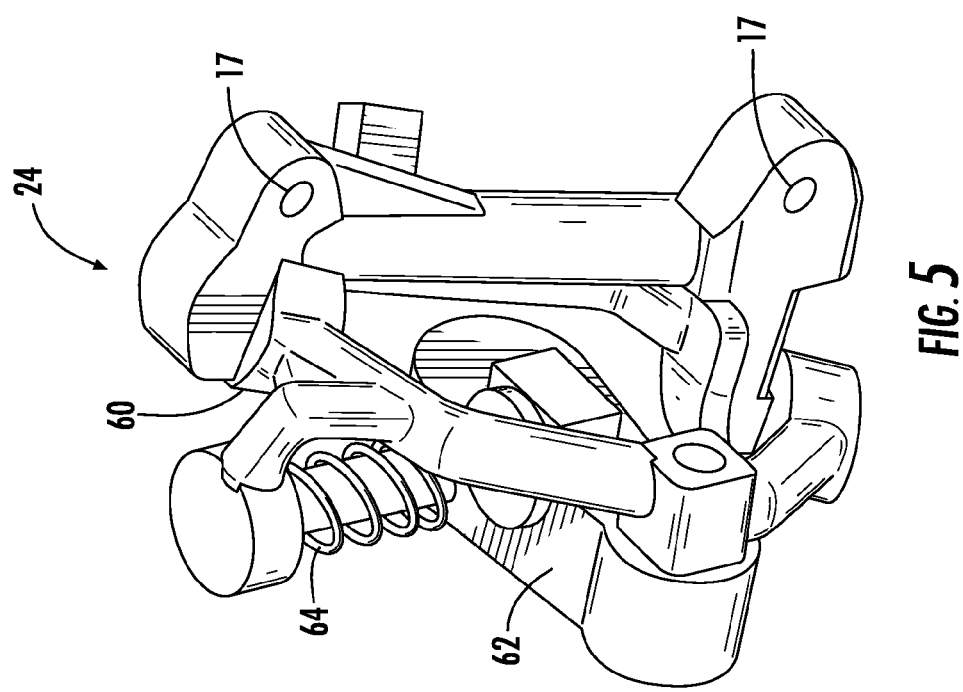
FIG. 5 is an inboard front perspective view of the hub of the present invention.
Figure 7:
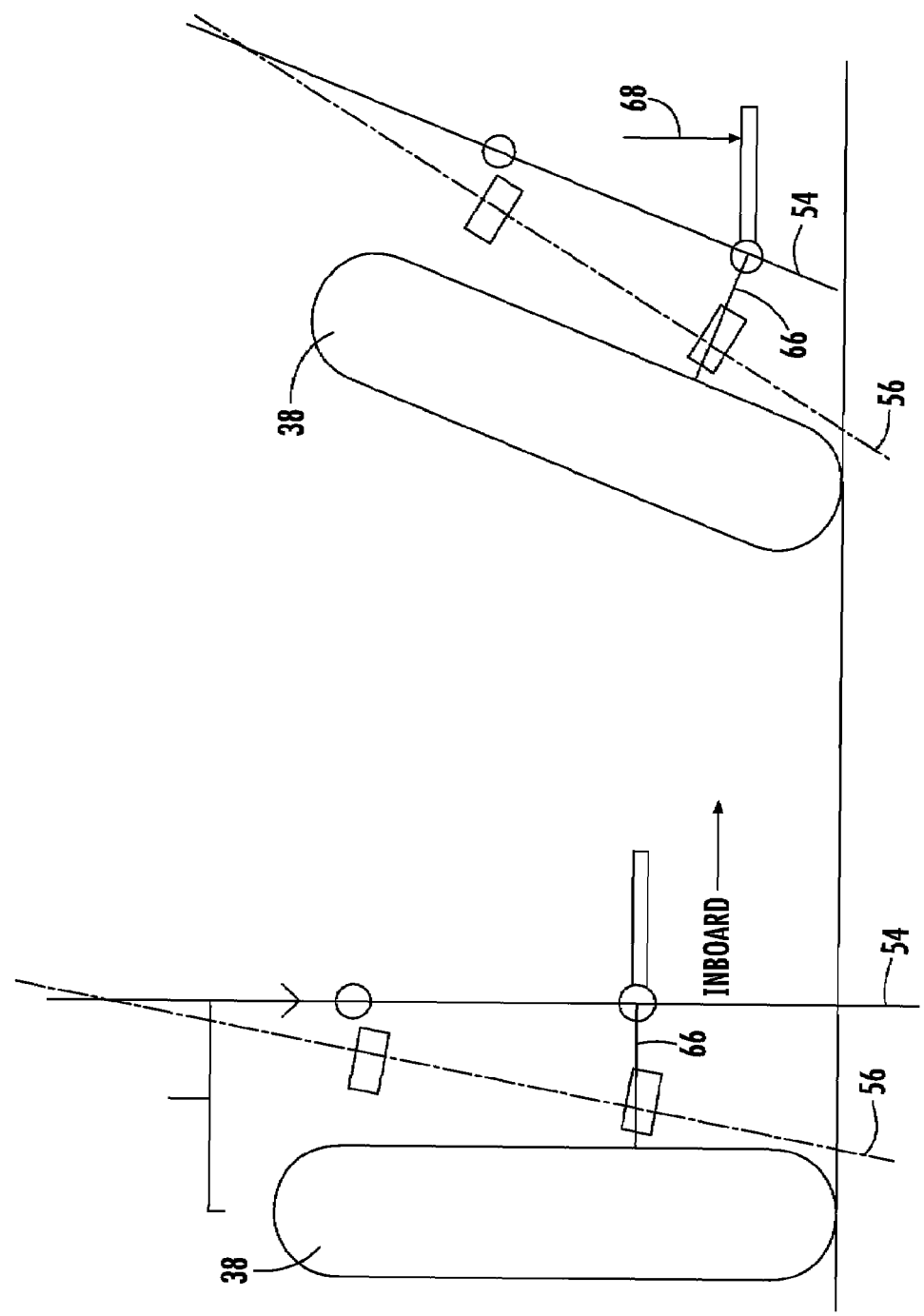
FIG. 7 is diagrammatic view of the suspension geometry improvements of the present invention.

Turning now to FIGS. 5 and 6, it can be further seen that in the preferred embodiments, the hub 24 of the present invention employs a control arm 60 that is pivotally attached to the hub and supports a swing arm 62 that is pivotally affixed to the control arm 60 and extends rearward to support the wheel 38, 40. This allows more leverage for steering force while also introducing a shock absorbing element into the suspension in the form of a spring 64 in that the swing arm 62 is spring biased downwardly in a manner that allows the suspension to include a spring system to dampen road bumps, shocks and the like.

Turning now to FIG. 7, it can be seen schematically that the tilting axis 54 between the suspension bars and the hubs is optimally positioned a few inches inboard relative to the wheels 38 thereby creating a lever arm 66 relative to the tilting of the wheel 38. While in the prior art, the steering axis 56 and tilting axis 54 were collinear, the separation of these axes in accordance with the present invention provides a much greater lever arm 66 sticking out perpendicularly from the wheel 38 on which to apply a downward force 68, thereby causing the wheels 38 and thus the suspension to cause the vehicle 12 to tilt. When the linkage pivots are closer in towards the center of the vehicle 12, the lever arms 66 are much longer and the downward force 68 from the foot of the rider has an amplified effect on the tilt of the vehicle. As a consequence, while the footpads rise and fall more dramatically as the linkage articulates, which takes a little getting used to, the rider is able to create substantial tilting force with less force application to the footpads. Further, by separating the two axes, the pivot points within the suspension are then attached using shoulder bolts and thrust bearings rather than the prior art ball joints. This arrangement makes the linkage connection points much more rigid.

It can therefore be seen that the present invention provides a novel suspension assembly for a tilting vehicle that enhances the stability thereof through the use of improved suspension geometry and steering control. Further, the present invention provides for a suspension assembly that separates the steering axes and tilting axes from one another on an manner that improves the vehicle's nimble and easy handling characteristics making a practical and fun vehicle to ride. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A suspension system for a tilting vehicle, comprising:
   a central frame having a front, a rear and a support means for a rider;
   a continuous top suspension bar and a continuous bottom suspension bar each having a respective left end and right end, a central portion of said top and bottom suspension bars being pivotally affixed to the central frame; and
   left and right hubs,
   each of said hubs having an interior portion with top end and a bottom ends wherein said left and right ends of said top and bottom suspension bars are pivotally attached to said respective top and bottom ends of said interior portion of said left and right hubs, the points of attachment between said left and right hubs and said top and bottom suspension bars forming tilting axes,
   each of said hubs having an exterior wheel support portion pivotally affixed to said interior portion, said pivots defining steering axes, said steering axes being located outboard from and inclined relative to said tilting axes forming a lever arm that reduces the force required to tilt said tilting vehicle.

2. The suspension system of claim 1, wherein tilting of said central frame displaces said top suspension bar relative to said bottom suspension bar causing said left and right suspension bars to tilt at an angle equal to the tilt of the central frame.

3. The suspension system of claim 2, wherein tilting of said central frame is controlled by exerting a downward force against one of the top or bottom suspension bars.

4. The suspension system of claim 1, wherein said left and right steering axes are inclined relative to one another such that they intersect at a top end thereof said bottom ends extending through a point where the wheels meet the ground.

5. The suspension system of claim 1, the exterior wheel support being a swing arm that is spring biased downwardly relative to said hubs.

6. The suspension system of claim 1, further comprising:
   a steering linkage extending between said exterior portion of said right and left hubs to simultaneously control the pivot of said exterior portion of said hubs relative to said steering axes.

7. The suspension system of claim 1, wherein said left and right steering axes are inclined relative to one another such that they intersect at a top end thereof.

* * * * *